US012011931B2

(12) United States Patent
Chover Lopez et al.

(10) Patent No.: US 12,011,931 B2
(45) Date of Patent: Jun. 18, 2024

(54) REFILL SYSTEM AND METHOD

(71) Applicant: HEWLETT-PACKARD DEVELOPMENT COMPANY, L.P., Spring, TX (US)

(72) Inventors: Carlos Chover Lopez, Sant Cugat del Valles (ES); Oriol Parera Fiestas, Sant Cugat del Valles (ES); Albert Ruzafa Villaret, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 128 days.

(21) Appl. No.: 17/756,544

(22) PCT Filed: Dec. 11, 2019

(86) PCT No.: PCT/US2019/065766

§ 371 (c)(1),
(2) Date: May 26, 2022

(87) PCT Pub. No.: WO2021/118561

PCT Pub. Date: Jun. 17, 2021

(65) Prior Publication Data

US 2022/0410576 A1 Dec. 29, 2022

(51) Int. Cl.
*B41J 2/175* (2006.01)

(52) U.S. Cl.
CPC ................................ *B41J 2/17506* (2013.01)

(58) Field of Classification Search
CPC .................................................. B41J 2/17566
See application file for complete search history.

(56) References Cited

U.S. PATENT DOCUMENTS 6,036,296 A 3/2000 Axtell et al.
6,224,198 B1 5/2001 Cook et al.
6,454,375 B2 9/2002 Wilson et al.
6,988,793 B2 1/2006 Wilson et al.
2002/0047882 A1 4/2002 Karlinski
2007/0151350 A1 7/2007 Sheldon
2009/0290002 A1 11/2009 Katoh
2011/0134171 A1* 6/2011 Leighton .............. B41J 2/17556 347/17
2013/0027479 A1* 1/2013 Chen .................... B41J 2/17566 347/85
2013/0104668 A1* 5/2013 Hanko ...................... G01F 3/38 73/861.43

FOREIGN PATENT DOCUMENTS

EP 2771191 12/2016
JP 2007105923 A 4/2007
WO WO-2010077387 A1 7/2010

* cited by examiner

*Primary Examiner* — Shelby L Fidler
(74) *Attorney, Agent, or Firm* — Jordan IP Law, LLC

(57) ABSTRACT

A fluid supply device includes a variable fluid volume to contain a supply of fluid and a variable gas volume to receive pressurized gas to pressurize the supply of fluid. A method of monitoring the fluid supply device may include controlling a gas pressure of the pressurized gas to feed the fluid from the fluid volume, the gas pressure varying in a plurality of pressurization cycles; monitoring a parameter of the pressurization cycles; and determining a change in fill state of the fluid volume as a function of the monitored parameter.

14 Claims, 3 Drawing Sheets

REFILL SYSTEM AND METHOD

BACKGROUND

In some printing systems, a printhead receives a stream of printing fluid from an intermediate tank which is supplied with ink from a supply tank. Printing fluid can be fed from the intermediate tank to the printhead using an air pump wherein the fill level in the intermediate tank can be monitored during refill from the supply tank and during printing when the printing fluid is fed to the printhead to detect both an end of refill and an empty state of the intermediate tank.

DESCRIPTION OF DRAWINGS

The following detailed description will best be understood with reference to the drawings, wherein.

DESCRIPTION OF EXAMPLES

Figure 1:
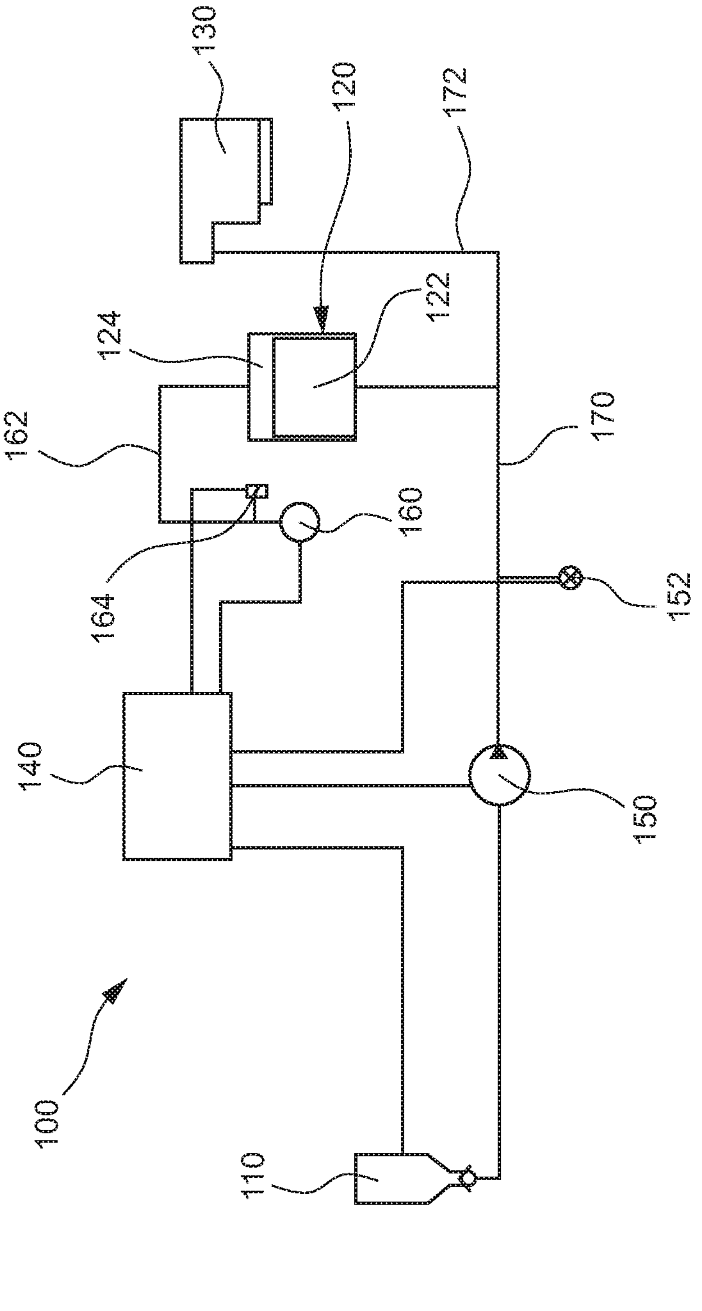
FIG. 1 shows a schematic diagram of a printing equipment according to an example.

FIG. 1 shows a schematic diagram of a printing equipment according to an example. In the example described, the printing fluid is an ink, such as a color ink, including CMYK inks, and white ink. The ink may be a latex ink or another type of ink. Accordingly, the tanks sometimes will be referred to as ink tanks, and the gas will be referred to as air. In other examples, the printing fluid can be a type of conditioning fluid used in inkjet type printers, including 2D and 3D printer. The gas can be an inert gas or other pressure gas instead of air. The printing equipment may be, may include, or may be part of a large format printer, for example.

In the example of FIG. 1, the printing equipment 100 comprises an ink supply tank 110, an intermediate tank 120, a printhead 130, a controller 140, an ink pump 150 and an air pressure source 160. The printhead 130 may be part of a printer and may be representative of a printing device or printing unit.

The printing equipment may include at least one fluid tank, as shown in FIG. 1. Any one of the fluid tanks, e.g. the intermediate tank 120 and the supply tank 110, can include a variable fluid volume to contain a supply of fluid and a variable gas volume to receive pressurized gas, such as air, to pressurize the supply of fluid. The variable fluid volume may be contained in a collapsible fluid reservoir, such as a collapsible ink bag, for example. The variable gas volume may be contained in an ink tank container surrounding the collapsible ink bag and may be separated from the variable fluid volume by the bag material. In another example, the variable fluid volume and the variable gas volume may be contained in a common ink tank container and be separated by a flexible membrane. The variable fluid volume and the variable gas volume are arranged relative to each other in such a way that they are separated but pressure applied to the gas volume can be transferred to the fluid volume and vice versa.

A fill state of the fluid tanks, such as the intermediate tank or the supply tank, can be measured using a fluid level sensor. The fluid level sensor can be a physical sensor provided in the tank or can be a pressure differential sensor, for example. A pressure differential senor may have an air pressure sensor connected to an air pressure supply line in communication with the variable gas volume and a fluid pressure sensor connected to a fluid supply line at a fluid input or fluid output of the fluid tank. The pressure differential sensor may operate based on a pressure difference between the air pressure supplied to the tank and the fluid pressure inside the tank in the fluid reservoir.

Fluid may be transferred from the supply tank to the intermediate tank or from the intermediate tank to the printing device using an air pump, for example. The intermediate tank may act as a buffer of printing fluid, and during normal printing operation is pressurized with air using an air pressure system in order to feed the printing device with printing fluid.

The air pump operates by pressurizing the air volume inside the tank and above or around the ink volume, by applying an air pressure which cycles between a lower_threshold_pressure and an upper_threshold_pressure. For example, the air pressure may be increased to the upper_threshold_pressure by activating the air pump and to force part of the ink volume out of the intermediate tank and towards the printing device. The air pump is deactivated upon reaching the upper_threshold_pressure, and the air pressure will decrease due to part of the ink being discharged from the intermediate tank and other factors, such as small air leaks. When the air pressure reaches the lower_threshold_pressure, the air pump may be again activated to increase the air pressure until it reaches the upper_threshold_pressure. This cycle may be repeated as long as the printing equipment is operating to deliver printing fluid to the printing device. At the end of a print job or in a printing pause, the system can be depressurized.

In a similar way, printing fluid may be transferred from the supply tank to the intermediate tank to refill the intermediate tank upon demand. Alternatively, the supply tank may use a different type of pump, such as a fluid pump, for example. A refill operation may be triggered by a level sensor in the intermediate tank, for example.

For example, when the printing fluid is consumed from the intermediate tank, the tank may be refilled from the supply tank using a fluid pump, which pushes printing fluid into the intermediate tank. In one example, the refill operation is continued until a differential pressure sensor, measuring fluid vs. air pressure, detects an end of refill state when the intermediate tank is considered full. The end of refill state can be detected by correlation of the differential pressure with a look up table of pressure values vs. fill level, for example.

Accordingly, a level sensor may generate an out of ink signal and/or an end of refill signal when certain fill levels are reached. The level sensor may be a differential pressure sensor comparing the pressure of printing fluid, such as ink, versus the air or other gas pressure, such as differential_pressure=ink_pressure−air_pressure. This differential pressure sensor may be sensitive to pressure variations caused by temperature changes or other influences in circuits of the fluid delivery system. Accordingly, in certain circumstance, the level sensor may generate an early or false positive signal. Therefore, a system and method to double check the fill state of the printing equipment's tanks can enhance reliability of the overall system. By providing an extra level of monitoring, false positive signals can be discovered and situations can be avoided where the intermediate tank is not completely filled or is over-filled during a refill operation, for example.

For example, not completely filling the intermediate tank, over time, may lead to emptying completely the intermediate tank and starving the printing device. As another example, not detecting an end of refill on time and overfilling an intermediate tank may cause a broken tank that can contaminate with printing fluid the air pressure system, control boards and other delicate components.

Accordingly, this disclosure can provide for checking that the intermediate tank is close to be fully refilled using the signals of the air pressure sensor. Based on a similar principle, it can be checked whether the intermediate tank or the supply tank is close to running empty. More generally, it can be ensured that a tank fill level is as desired. This can work as a safety double-check of an end of refill detection using a differential pressure sensor, because it uses an independent sensor to do so. This safety check hence can enhance reliability of detection of a fill state of a component, such as a tank in an ink or other fluid delivery system.

An end of refill safety diagnostic of the intermediate tank is provided by monitoring the output signal of an air pressure sensor. With increasing ink volume and decreasing air volume, the frequency of the air pump cycle between the lower_threshold_pressure and the upper_threshold_pressure will increase. The frequency increase or a related parameter can be used as a measure of a close to full state of the ink tank. Examples of a related parameter are a change in cycle period and a change in cycle slope, as illustrated below.

As described, the inner volume of a fluid tank is divided in two parts, the fluid volume and the air volume. The fluid volume may be enclosed by a fluid bag, such as a plastic bag, while the air volume can be the space between this bag and the external walls of the tank. When a refill operation starts, part of the fluid inside the fluid bag has been previously used, hence the volume of fluid inside the bag is low and the volume of air inside the tank and surrounding the fluid bag is relatively large, e.g. in a ratio of 80:20 or 75:25 of air:fluid volume. As a consequence, it takes more time to an air pressure system to pressurize the larger air volume when compared to a full or almost full fluid tank, e.g. one having an air:fluid volume ratio of 20:80 or 25:75, because of the larger volume of air that needs to have its pressure increased. Then, during the refill operation, the amount of fluid inside the tank increases due to the fluid being pushed into the tank, resulting in the increase of volume of the fluid bag and the reduction of the air volume. Thus, as the refill operation goes on, the quantity of air to be pressurized becomes smaller and thus the duration of one pressurization cycle become shorter, the frequency of pressurization cycles increases and the slope of a respective air pressure cycle becomes steeper.

Accordingly, an end of refill safety diagnostic of the tank can be provided by monitoring the output signal of an air pressure sensor. With increasing ink volume and decreasing air volume, the frequency of the air pump cycle between the lower_threshold_pressure and the upper_threshold_pressure will increase. The frequency increase or a related parameter can be used as a measure of a full or close to full state of the ink tank or of an empty or close to empty tank.

FIG. 1 shows a schematic diagram of a printing equipment according to an example. As indicated above, the printing equipment 100 comprises the ink supply tank 110, the intermediate tank 120, the printhead 130, the controller 140, the ink pump 150 and the air pressure source 160. The printhead 130 may be part of a printer and may be representative of a printing device or printing unit.

The ink supply tank 110 is connected to the intermediate tank 120 via a first feed line 170, with the ink pump 150 coupled to the first feed line 170. The intermediate tank 120 is connected to the printhead 130 via a second feed line 172. The ink flow is directed towards the printhead or the intermediate tank by the ink pump and the air pump. An air pressure line 162 is connecting the air pressure source 160 and the intermediate tank 120.

A fluid pressure sensor 152 is coupled to the first feed line 170, downstream of the ink pump 150 to detect a fluid pressure in the first feed line 170 and hence in the intermediate tank 120 connected thereto. An air pressure sensor 164 is coupled to the air pressure line 162, downstream of the air pressure source 160 to detect an air pressure in the air pressure line 162 and hence in the intermediate tank 120 connected thereto.

In the example, the intermediate tank 120 includes an ink volume 122 and an air volume 124 which are separated by a flexible membrane, wall, bag or the like in such a way that they are physically separated but a pressure increase in the air volume is translated to the ink volume and vice versa. For example, the intermediate tank 120 includes a container enclosing a collapsible ink bag and a volume of air between the inner walls of the container and the outer wall of the ink bag. Accordingly, the first fluid line 170 is coupled to the ink volume 122 inside the intermediate tank 120 and the air pressure line 162 is coupled to the air volume 124 inside the intermediate tank 120.

The supply tank 110, the ink pump 150, the air pressure source 152, the fluid pressure sensor 152 and the air pressure sensor 164 are communicatively coupled to the controller 140 wherein communication can be wireless or wired to control operation of these components and to receive feedback signals from the sensors 152 and 164 and to control a refill operation. In addition, the printhead 130 can be coupled to the same or a different controller to control the printing operation. The controller 140 can be a single control system, a distributed control system and can be implemented in hardware, firmware, software and combinations thereof.

Whereas, FIG. 1 shows printing equipment 100 including a single supply tank 110, intermediate tank 120 and printhead 130, the equipment may comprise a plurality of supply tanks, intermediate tanks and printheads, e.g. one for each color of Black, Cyan, Magenta and Yellow inks and possible additional inks and other fluid, e.g. a pre- or post-treatment fluid. The number of printheads may be different from the number of supply tanks and intermediate tanks because a single printhead may be to eject more than one color or type of ink.

In a printing equipment designed for multiple types of ink, such as BCMY inks and conditioning fluids for example, a separate ink pump may be provided in respective separate fluid lines between a respective supply tank and a respective intermediate tank for each type of ink. Each fluid line may be connected to a respective fluid pressure sensor. Further, a single air pressure source may be connected to each one of the respective intermediate tanks, with a single air pressure sensor connected to the air pressure line downstream of the air pressure source or with multiple air pressure sensor connected to air inlets of the respective intermediate tanks.

Whereas, FIG. 1 shows printing equipment 100 having a supply tank 110 from which the ink is delivered using ink pump 150; in another example, the supply tank could be designed similar to the intermediate tank, having an ink supply volume and a separated air volume (not shown), with an air pressure source connected thereto to pressurize the ink supply volume to drive ink from the supply tank into the fluid line 170. The air pressure source could be the same as the air pressure source 160 used for intermediate tank 120 or could be a separate one.

Figure 2:
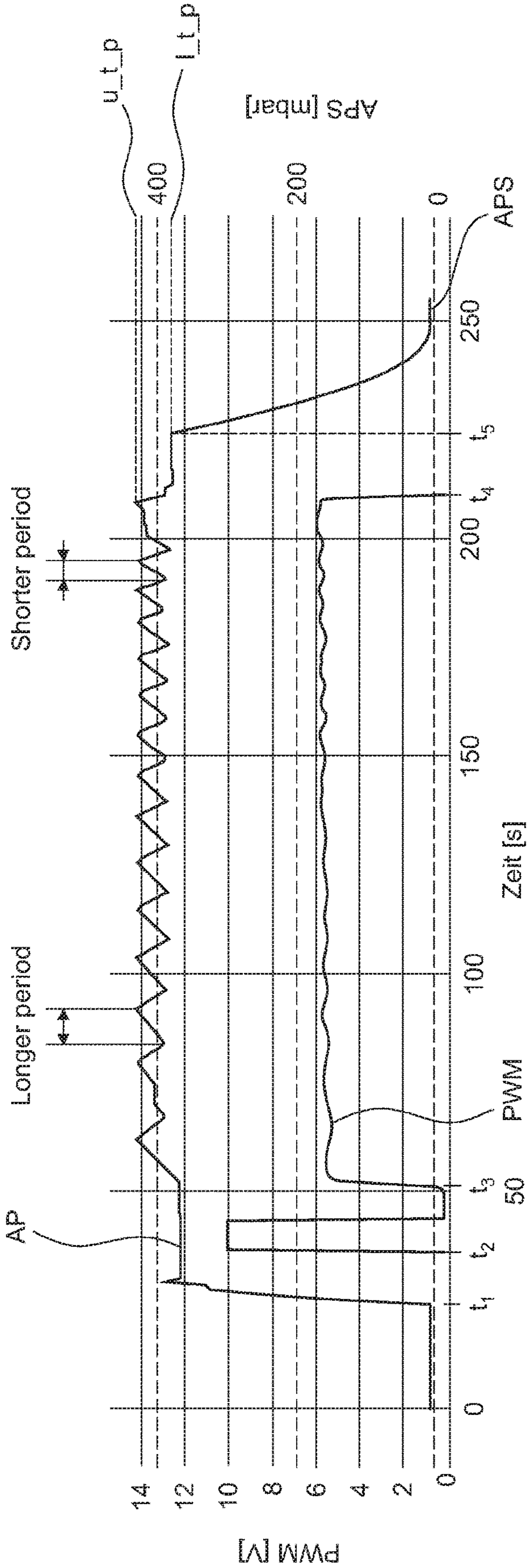
FIG. 2 shows a graph of different parameters of a refill operation of a printing equipment according to another example.

A refill operation of the printing equipment 100 according to an example is described with reference to FIG. 2. FIG. 2 shows a diagram of an air pressure curve of air pressure of the air volume 124 above ink volume 122 of the intermediate tank 120 for illustrating an example of operation of a fluid supply system. The air pressure curve is designated as AP and air pressure values relative to atmospheric pressure are indicated at the right-hand side of the diagram, in a range from 0 mpsi to about 400 mbar (about 6000 mpsi). These values as well as further values indicated in the diagrams are to be understood as examples without limitation thereto. 1 bar is about 14.5 psi (pound per square inch).

The diagram of FIG. 2 further shows a voltage curve PWM of a drive voltage of the ink pump 150 for feeding ink from the supply tank 110 to the intermediate tank 120. A voltage of 0 V corresponds to an inactive pump where no ink is supplied to the intermediate tank and a voltage at some operating level, such as about 6 V in this example, corresponds to an active pump which feeds ink from the supply tank 110 to the intermediate tank 120 during a refill operation. The ink pump 150 can be controlled by the controller 140 based on feedback signals from a level sensor in the intermediate tank. As explained above, the level sensor can be a pressure differential sensor, for example. A pressure differential senor may have an air pressure sensor 164 connected to the air pressure supply line 162 in communication with the variable gas volume and a fluid pressure sensor 152 connected to a fluid supply line 170 at a fluid input or fluid output of the fluid tank. The pressure differential sensor hence may operate based on a pressure difference between the air pressure supplied to the tank and the fluid pressure inside the tank in the fluid reservoir.

A refill state of the intermediate tank can be detected by detecting a differential pressure and mapping the differential pressure to a fill level, using a look up table of pressure values vs. fill levels or a known differential pressure versus fill level characteristic, e.g. using a correlation curve, for example. As the differential pressure sensor may be sensitive to pressure variations caused by temperature changes or other influences in circuits of the fluid delivery system, in certain circumstance, the level sensor may generate an early or false positive signal. That is, the level senor may signal a full tank before the tank actually is filled to a desired level, e.g. to at least 75% or 805 of its maximum capacity. The level sensor also may fail to detect a full state of the intermediate tank. Therefore, the air pressure measurement is used to double check the fill state of the intermediate tank.

As shown in FIG. 2, an air pressure is increased from 0 psi to a first pressure value, about 6 psi in this example, at a time t1 where a printing operation is started and ink is delivered from the intermediate tank 120 to the printing device 130 by pressurizing the ink in the ink volume 122 and forcing ink out of the intermediate tank and towards the printing device. At a time t2, it is detected that the ink level of the intermediate tank 120 is below a threshold value, e.g. below 20% or 25% of its maximum fill level, using a level sensor and a refill operation is triggered. Accordingly, the ink pump 150 is activated, as illustrated by a switch-spike at t2. In this example, at the time t2, the system may be checking that the ink pump is working before starting the refill operation, generating the spike. At t3, the ink pump voltage is ramped up to is operational voltage, which is about 6 V in this example. Ink continues to be fed by the ink pump 150 from the supply tank 110 to the intermediate tank 120 until a full or nearly full state of the intermediate tank 120 is detected at t4. A full or nearly full state may correspond to an ink volume of 75% or 80% of a maximum tank capacity, for example. At t4, the ink pump 150 is deactivated by ramping down the drive voltage PWM.

As explained, sensor signals from ink pressure sensor 152 and air pressure sensor 160 are fed to controller 140, controller 140 processes sensor signals and controls operation of ink pump 150 and air pressure source 160. In this example, the level sensor hence is a differential pressure sensor.

The air pump operates by pressurizing the air volume inside the tank and above or around the ink volume, by applying an air pressure which cycles between a lower_threshold_pressure and an upper_threshold_pressure, l_t_p and u_t_p in the example of FIG. 2. For example, the air pressure may be increased to the upper_threshold_pressure by activating the air pump to force part of the ink volume out of the intermediate tank and towards the printing device. The air pump is deactivated upon reaching the upper_threshold_pressure, and the air pressure will decrease due to part of the ink being discharged from the intermediate tank and other factors, such as small air leaks. When the air pressure reaches the lower_threshold_pressure, the air pump may be again activated to increase the air pressure until it reaches the upper_threshold_pressure. This cycle may be repeated as long as the printing equipment is operating to deliver printing fluid to the printing device, from t1 to t5 in the example of FIG. 2. At the end of a print job or in a printing pause, the system can be depressurized, at t5 in the example of FIG. 2.

During a refill period, from t3 to t4 in this example, the amount of fluid inside the tank increases due to the fluid being pushed into the tank from the supply tank resulting in the increase of volume of the fluid bag and the reduction of the air volume. Thus, as the refill operation goes on, the quantity of air to be pressurized becomes smaller and thus the duration of one pressurization cycle become shorter, the frequency of pressurization cycles increases and the slope of a respective air pressure cycle becomes steeper. This is illustrated in curve AP, where a pressurization cycle has a longer period and smaller slope at the beginning of the refill operation and a shorter period and greater slope at the end of the pressurization cycle.

By monitoring a parameter of the pressurization cycles, a change in the fill state of the fluid volume can be determined as a function of the monitored parameter. The parameter may be at least one of a frequency, a duration or a slope of the pressurization cycles. The controller may e.g. detect a reduction of the period or duration of respective pressurization cycles between a first pressurization cycle at the beginning of a refill operation and each current pressurization cycle. If the period of a current pressurization cycle is at or below a defined fraction, e.g. x %, of the initial pressurization cycle, the controller may determine that the tank has reached a desired fill level, e.g. 75% or 80% of its maximum capacity. Just as an example, $30<x<70$, or x is about 50. In another example, the controller may detect an absolute value of the period or duration of a current pressurization cycle. If the period of a current pressurization cycle is at or below a defined value, e.g. y ms, the controller may determine that the tank has reached a desired fill level, e.g. 75% or 80% of its maximum capacity. Just a s an example, $2<y<10$, or y is about 5.

In a similar manner, a desired fill level can be determined based on the frequency of pressurization cycles or the slope of pressurization cycles, for example.

In the example of FIGS. 1 and 2, an ink delivery system is illustrated having one supply tank and one intermediate tank to feed ink to one printhead. Instead, the equipment may comprise a plurality of supply tanks, intermediate tanks and printheads, e.g. one for each color of Black, Cyan, Magenta and Yellow inks and possible additional inks and other fluid, e.g. a pre- or post-treatment fluid. The number of printheads may be different from the number of supply tanks and intermediate tanks because a single printhead may be to eject more than one type of ink.

For a printing equipment comprising a plurality of supply tanks and a plurality of intermediate tanks, the refill operation of the printing equipment 100 may proceed in a similar manner as described above with reference to FIG. 2. Depending on which and how many of intermediate tanks are to be refilled, respective ink pumps will be activated, as shown by respective voltage curves of a drive voltages of ink pumps for feeding ink from respective supply tanks to intermediate tanks. The respective voltage curves may be similar or the same as curve PWM.

Further, in case that a single air pressure source is used, depending on the number of intermediate tanks to be refilled, the air pressure curve may be similar to the one AP shown in FIG. 2 but the difference between the lower_threshold_pressure and the upper_threshold_pressure, and/or the change in cycle periods can be different because overall a larger air volume has to be generated when operating more than one intermediate tank.

As explained above, monitoring the air pressure curve can be used to monitor progress of a refill operation when ink is fed from the supply tank to the intermediate tank. Monitoring can be in addition to use of a level sensor, including a differential pressure sensor. Additionally or alternatively, monitoring can be in addition to monitoring operation of the ink pump which is controlled to generate a defined ink flow.

Monitoring of the air pressure curve may signal an unexpected change in a pressurization cycle parameter, i.e. a parameter change not in line with the signal provided by the level sensor or the progress in feeding ink by the ink pump. In such a case, an error signal may be generated, the ink pump may be stopped, an extra level measurement may be performed at the intermediate tank or a combination of these and other safety precautions can be triggered. The refill operation may be resumed after clarification of the unexpected event.

Whereas, the example described with reference to FIG. 2 relates to monitoring a refill operation of the intermediate tank, the same principle can also be applied to monitoring a fill state of the intermediate tank or the supply tank while it is being emptied by feeding ink to the printing device or the intermediate tank, respectively. Instead of looking for a decreasing pressurization cycle period, a decrease in fill level is signaled by an increase in pressurization cycle period. This principle can also be applied to the supply tank if the supply tank is designed as described above for the intermediate tank, i.e. if the supply tank is divided in two parts, including an air volume and an ink volume and is operated by an air pressure source or air pump, as described in further detail above.

Figure 3:
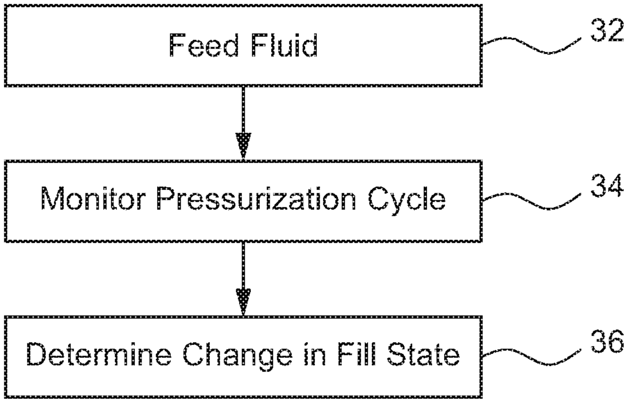
FIG. 3 shows a flow diagram of a method of monitoring a fluid supply device, according to an example.

A method of monitoring a fluid supply device, according to an example, is described next with reference to the flow diagram of FIG. 3. The method can be used to monitor a refill operation of a fluid tank, such as the intermediate tank and/or to monitor a fluid discharge operation from a fluid tank, such as the intermediate tank and the supply tank. The tank includes a variable fluid volume to contain a supply of fluid and a variable gas volume to receive pressurized gas to pressurize the supply of fluid. The method comprises: controlling a gas pressure of the pressurized gas to feed the fluid from the fluid volume, the gas pressure varying in a plurality of pressurization cycles, at 32; monitoring a parameter of the pressurization cycles, at 34; and determining a change in fill state of the fluid volume as a function of the monitored parameter, at 36.

Controlling the gas pressure may include increasing the gas pressure to an upper pressure threshold by activating a gas pressure pump; decreasing the gas pressure to a lower pressure threshold by deactivation the gas pressure pump; and repeating the increasing and decreasing of the gas pressure, wherein the parameter includes at least one of a frequency, a period or a slope of the cycle of increasing and decreasing of the gas pressure.

The method may be performed using a printing equipment and refill system as described above with reference to FIG. 1, without limitation thereto. The refill system may include a fluid tank including a collapsible fluid reservoir to contain a fluid and an outer container to enclose the collapsible fluid reservoir; an air pump connected to the fluid tank to pressurized the fluid in the collapsible reservoir to feed the fluid from the fluid tank to a consumer; an air pressure sensor to monitor an air pressure provided by the air pump; and a controller to monitor a fill level of the fluid tank based on a change of air pressure over a plurality of air pressure cycles generated by the air pump.

The printing equipment may include a supply tank to hold a supply of printing fluid; an intermediate tank including a collapsible fluid reservoir to contain printing fluid and an outer container to enclose the collapsible fluid reservoir; a printing unit; a fluid pump connected to the supply tank to feed the printing fluid from the supply tank to the intermediate tank; an air pump connected to the intermediate tank to pressurized the printing fluid in the collapsible reservoir to feed the printing fluid from the intermediate tank to the printing unit; an air pressure sensor to monitor an air pressure provided by the air pump; a controller to control the fluid pump to refill the intermediate tank from the supply tank and to monitor a fill level of the intermediate tank based on a change over time of a plurality of pressure cycles of the air pressure provided by the air pump.

The method may be performed at least in part by software, hardware and/or firmware and may be implemented at least in part in the controller 140.

The invention claimed is:

1. A method of monitoring a fluid supply device, the device including a variable fluid volume to contain a supply of fluid and a variable gas volume to receive pressurized gas to pressurize the supply of fluid, the method comprising:

controlling a gas pressure of the pressurized gas to feed the fluid from the fluid volume, the gas pressure varying in a plurality of pressurization cycles;

monitoring a parameter of the pressurization cycles; and determining a change in fill state of the fluid volume as a function of the monitored parameter, wherein the parameter is a period of at least one of the pressurization cycles, and wherein the determining the change in fill state comprises determining that the fill state is above an upper threshold level if a decrease in the period of the at least one of the pressurization cycles is detected.

2. The method of claim 1 wherein the parameter includes at least one of a frequency, a duration or a slope of the pressurization cycles.

3. The method of claim 1, wherein
the parameter is a period of the pressurization cycle; and
determining the change in fill state comprises:
determining that the fill state is below a lower threshold level if an increase in the period of the pressurization cycles is detected.

4. The method of claim 3 wherein determining that the fill state is below the lower threshold level triggers a notification to a system or a user.

5. The method of claim 1
wherein controlling the gas pressure includes
increasing the gas pressure to an upper pressure threshold by activating a gas pressure pump;
decreasing the gas pressure to a lower pressure threshold by deactivation the gas pressure pump; and
repeating the increasing and decreasing of the gas pressure, wherein
the parameter includes at least one of a frequency, a period or a slope of the cycle of increasing and decreasing of the gas pressure.

6. The method of claim 5 wherein
the fluid volume and gas volume are part of an intermediate tank to supply the fluid to a printing device; and
the increasing and decreasing of the gas pressure is repeated during a printing sequence, wherein
a fluid tank refill operation is controlled as a function of the determined change in fill state.

7. The method of claim 5 wherein
the fluid volume and gas volume are part of supply tank to supply the fluid to an intermediate tank of a printing device; and
the increasing and decreasing of the gas pressure is repeated until determining that the fill state is below a lower threshold level.

8. A refill system, including
a fluid tank including a collapsible fluid reservoir to contain a fluid and an outer container to enclose the collapsible fluid reservoir;
an air pump connected to the fluid tank to pressurized the fluid in the collapsible reservoir to feed the fluid from the fluid tank to a consumer;
an air pressure sensor to monitor an air pressure provided by the air pump;
a controller to monitor a fill level of the fluid tank based on a change of air pressure over a plurality of air pressure cycles generated by the air pump, and the controller to determine a change in a fill state of fluid volume as a function of a monitored parameter,
wherein the parameter is a period of at least one pressurization cycle, and
wherein the determining the change in the fill state comprises determining that the fill state is above an upper threshold level if a decrease in a period of the at least one pressurization cycle is detected.

9. The refill system of claim 8, wherein
the fluid tank is an intermediate tank; and further including
a supply tank to hold a supply of fluid; and
a fluid pump connected to the supply tank to feed the fluid from the supply tank to the intermediate tank during a refill period.

10. The refill system of claim 9, wherein
the controller further is to control the air pump and the fluid pump as a function of the monitored fill level.

11. The refill system of claim 10, further including
a differential pressure sensor to monitor a pressure difference between an ink pressure in the collapsible reservoir and the air pressure; wherein
the controller is to monitor the fill level of the fluid tank based on the air pressure provided by the air pump and based on a signal by the differential pressure sensor.

12. The refill system of claim 8, wherein
the fluid tank is a supply tank; and further including
an intermediate tank to receive a supply of fluid from the supply tank.

13. The system of claim 8 wherein the controller is to monitor the fill level based on a change of a parameter related to the plurality of air pressure cycles, the parameter including at least one of a frequency, a duration or a slope of the pressurization cycles.

14. A printing equipment, including
a supply tank to hold a supply of printing fluid;
an intermediate tank including a collapsible fluid reservoir to contain printing fluid and an outer container to enclose the collapsible fluid reservoir;
a printing unit;
a fluid pump connected to the supply tank to feed the printing fluid from the supply tank to the intermediate tank;
an air pump connected to the intermediate tank to pressurized the printing fluid in the collapsible reservoir to feed the printing fluid from the intermediate tank to the printing unit;
an air pressure sensor to monitor an air pressure provided by the air pump;
a controller to control the fluid pump to refill the intermediate tank from the supply tank and to monitor a fill level of the intermediate tank based on a change over time of a plurality of pressure cycles of the air pressure provided by the air pump, and to determine a change in a fill state of fluid volume as a function of a monitored parameter,
wherein the parameter is a period of at least one pressurization cycle, and
wherein the determining the change in the fill state comprises determining that the fill state is above an upper threshold level if a decrease in a period of the at least one pressurization cycle is detected.

* * * * *